US006546484B2

(12) United States Patent
Hirai

(10) Patent No.: US 6,546,484 B2
(45) Date of Patent: Apr. 8, 2003

(54) PROGRAM MODULE MANAGEMENT SYSTEM AND METHOD THEREOF AND STORING MEDIUM OF MANAGEMENT PROGRAMS OF THE SYSTEM

(75) Inventor: Nobuyuki Hirai, Kanagawa (JP)

(73) Assignee: NEC Electronics Corporation, Tokyo (JP)

( * ) Notice: Subject to any disclaimer, the term of this patent is extended or adjusted under 35 U.S.C. 154(b) by 51 days.

(21) Appl. No.: 09/931,775

(22) Filed: Aug. 20, 2001

(65) Prior Publication Data

US 2002/0023196 A1 Feb. 21, 2002

(30) Foreign Application Priority Data

Aug. 21, 2000 (JP) ........................................ 2000-254274

(51) Int. Cl.$^7$ .............................. G06F 9/06; G06F 9/50; G06F 13/10
(52) U.S. Cl. .............................. 713/2; 713/100; 710/10; 710/9; 711/154
(58) Field of Search .............................. 713/2, 1, 100; 710/10, 9, 8; 711/154, 170, 102, 103, 104, 105, 202, 206

(56) References Cited

U.S. PATENT DOCUMENTS

| | | | | | |
|---|---|---|---|---|---|
| 5,274,816 A | * | 12/1993 | Oka | ............................... | 713/2 |
| 5,590,373 A | * | 12/1996 | Whitley et al. | ................ | 710/8 |
| 5,819,043 A | * | 10/1998 | Baugher et al. | ............ | 709/222 |
| 5,918,047 A | * | 6/1999 | Leavitt et al. | ................. | 713/2 |
| 5,933,631 A | * | 8/1999 | Mealey et al. | .................. | 713/2 |
| 5,938,766 A | * | 8/1999 | Anderson et al. | ........... | 713/100 |
| 5,940,850 A | * | 8/1999 | Harish et al. | ................ | 711/102 |
| 6,112,303 A | * | 8/2000 | Stancil | ............................ | 713/2 |
| 6,212,632 B1 | * | 4/2001 | Surine | ............................. | 713/2 |
| 6,216,224 B1 | * | 4/2001 | Klein | ............................... | 713/1 |
| 6,330,667 B1 | * | 12/2001 | Klein | ............................... | 713/1 |
| 6,393,492 B1 | * | 5/2002 | Cornaby et al. | ............. | 709/321 |
| 6,401,198 B1 | * | 6/2002 | Harmer et al. | .................. | 713/1 |
| 6,421,776 B1 | * | 7/2002 | Hillis et al. | ..................... | 713/2 |
| 6,434,695 B1 | * | 8/2002 | Esfahani et al. | ................ | 713/2 |
| 6,446,139 B1 | * | 9/2002 | Leung et al. | ................... | 710/1 |

FOREIGN PATENT DOCUMENTS

| | | |
|---|---|---|
| JP | 59-114602 | 7/1984 |
| JP | 63-228249 | 9/1988 |

* cited by examiner

Primary Examiner—Hong Kim
(74) Attorney, Agent, or Firm—Foley & Lardner

(57) ABSTRACT

A program module management system and a method thereof, and a storing medium of management programs of the system, in which plural program modules are loaded into arbitrary addresses in the RAM efficiently without loading the same program module into the RAM and the plural program modules can be executed on the RAM by a CPU, are provided. The program module management system provides a CPU for executing programs and operation processes, a ROM for storing program modules, a loading RAM which program modules are loaded into, and a RAM in which variables and stacks being necessary for executing the programs are stored. And the ROM provides a list table in which each start address of the program modules that are loaded into the loading RAM and each size of the program modules corresponding to the start address on the ROM are stored. And the loading RAM provides module management information in which each start address of the program modules storing in the loading RAM and each relative address of the program modules corresponding to the start address on the loading RAM are stored, in this, the relative address signifies the absolute value of the difference between each start address on the ROM and each start address on the loading RAM of each of the program modules=offset. And the program modules in the loading RAM are managed by management programs in the ROM.

23 Claims, 9 Drawing Sheets

FIG. 6

| (1) START ADDRESS OF PROGRAM MODULE ON ROM | SIZE OF PROGRAM MODULE |
|---|---|
| (2) START ADDRESS OF PROGRAM MODULE ON ROM | SIZE OF PROGRAM MODULE |
| (3) START ADDRESS OF PROGRAM MODULE ON ROM | SIZE OF PROGRAM MODULE |
| ⋮ | ⋮ |
| (n) START ADDRESS OF PROGRAM MODULE ON ROM | SIZE OF PROGRAM MODULE |

FIG. 7

| (1) START ADDRESS OF PROGRAM MODULE ON RAM | RELATIVE ADDRESS |
|---|---|
| (2) START ADDRESS OF PROGRAM MODULE ON RAM | RELATIVE ADDRESS |
| (3) START ADDRESS OF PROGRAM MODULE ON RAM | RELATIVE ADDRESS |
| ⋮ | ⋮ |
| (m) START ADDRESS OF PROGRAM MODULE ON RAM | RELATIVE ADDRESS |

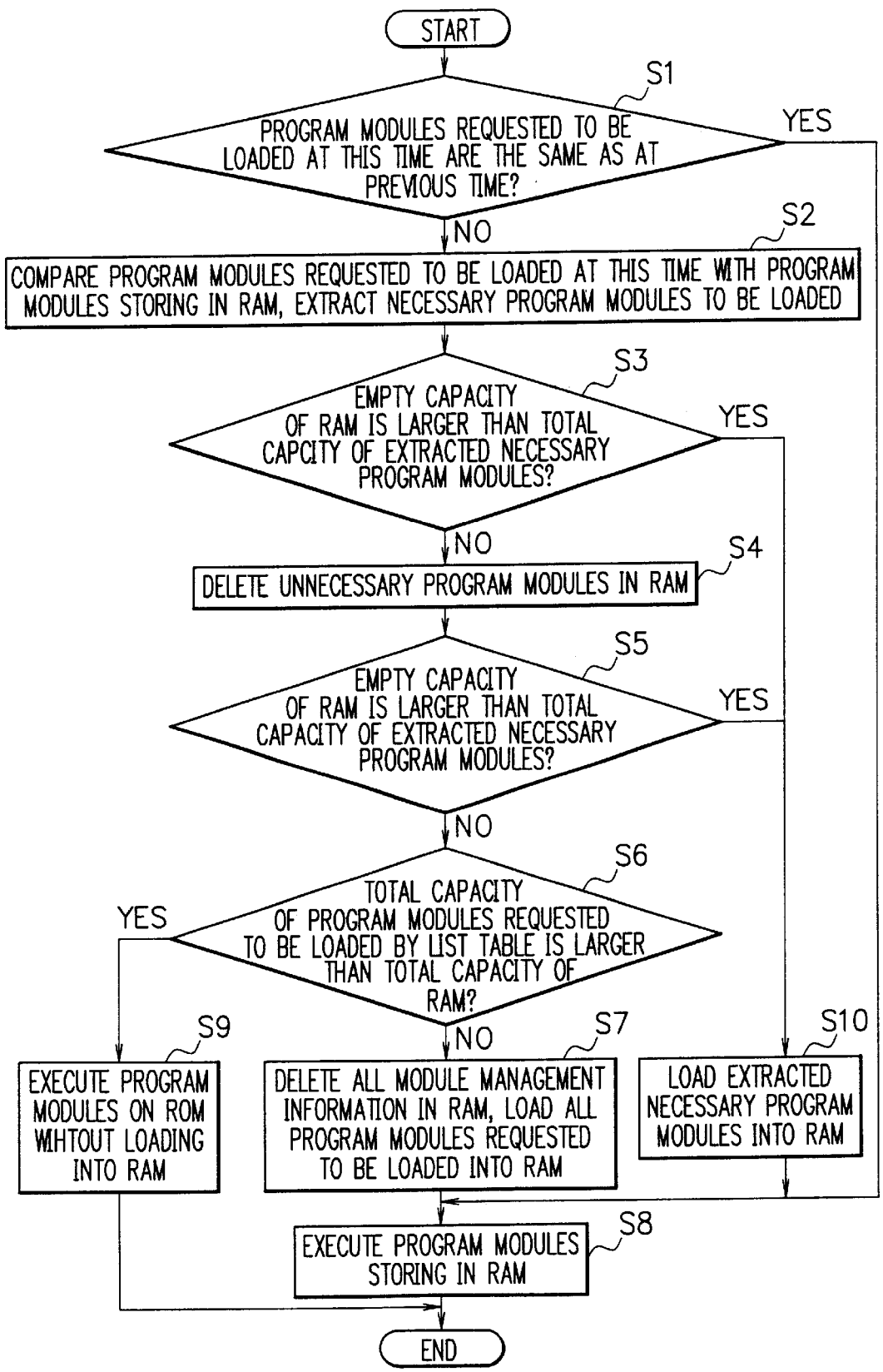

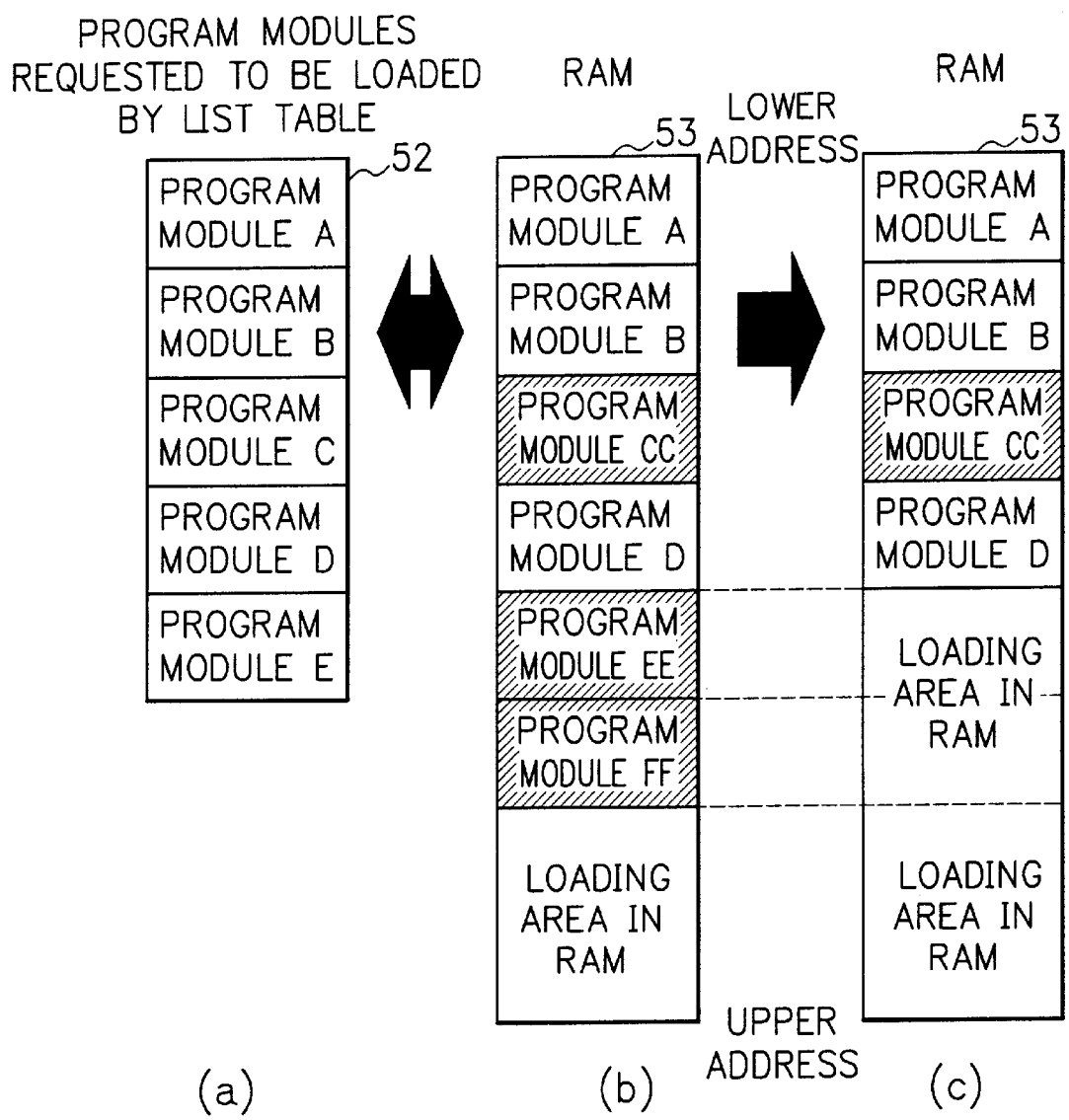

REMARKS : SIZE 1 < RAM TOTAL AREA
SIZE 2 < SIZE 3
SIZE 2 < SIZE 3 + SIZE 4

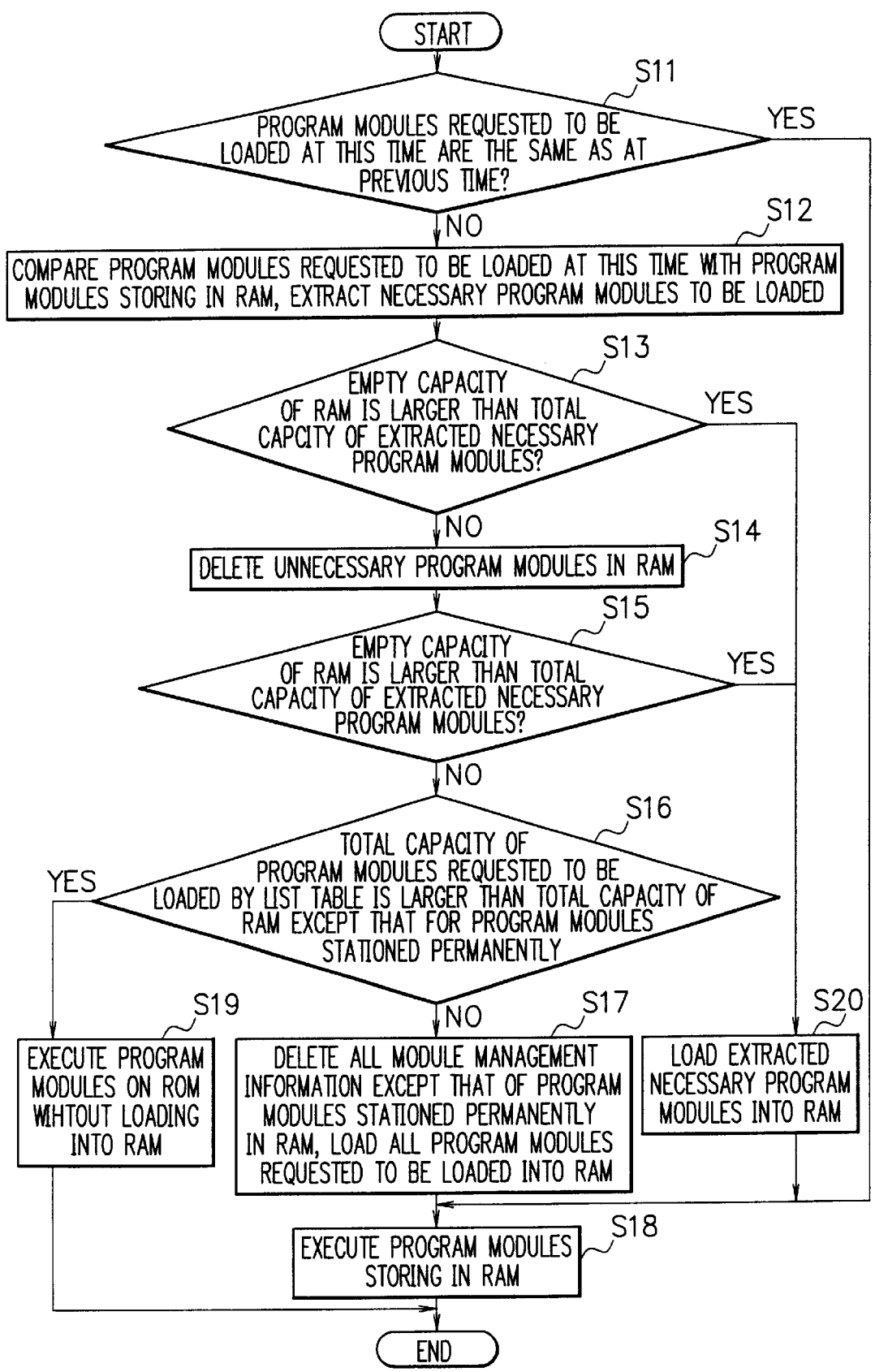

PROGRAM MODULE MANAGEMENT SYSTEM AND METHOD THEREOF AND STORING MEDIUM OF MANAGEMENT PROGRAMS OF THE SYSTEM

BACKGROUND OF THE INVENTION

The present invention relates to a program module management system and a method thereof, and a storing medium of management programs of the system, in particular, in which program modules are loaded into a memory.

DESCRIPTION OF THE RELATED ART

Conventionally, when a CPU fetches a program from a large capacity and low speed memory such as an external ROM (non-volatile memory), it is necessary to control such as that a wait is inserted at the read timing of the program from the memory. Consequently, there is a problem that the program fetching speed to the CPU is lowered.

FIG. 1 is a block diagram showing a structure of a micro computer of a first conventional example. As show in FIG. 1, the micro computer consists of a CPU 91, a ROM 92, a RAM 93, a program module A 94 storing in the ROM 92, and the program module A 95 loaded and storing in the RAM 93.

In FIG. 1, the RAM 93, to which the CPU 91 can fetch a program module at a high speed, is connected to the CPU 91, and the program module is loaded into the RAM 93, and the program module is executed by the CPU 91. This operation is explained in detail. The program module A 94 storing in an arbitrary address of the ROM 92 is loaded into an arbitrary address of the RAM 93 by the CPU 91. And a program counter (PC) of the CPU 91 is set at the start address of the program module A 95 loaded and storing in the RAM 93. With this, a high speed fetching on the RAM 93 by the CPU 91 is realized.

Japanese Patent Application Laid-Open No. SHO 63-228249 discloses a program loading system. In this application, a RAM, which program modules are loaded into, is used efficiently. And Japanese Patent Application Laid-Open No. SHO 59-114602 discloses a programmable controller. In this application, program modules, which are loaded into a RAM, are controlled.

FIG. 2 is a block diagram showing a structure of the program loading system described in the Japanese Patent Application Laid-Open No. SHO 63-228249 as the first conventional example. In this application, a main memory which the program modules are loaded into is used efficiently.

As shown in FIG. 2, the program loading system at the first conventional example consists of an automatically address deciding unit 101, an address designating unit 102, a parameter 103, and a main memory 104.

The automatically address deciding unit 101 decides the loading address of a program module by allocating in order from the lower address of a memory, like a conventional program loading system. The address designating unit 102 decides the loading address of a program module by allocating in order from the upper address of the memory. The parameter 103 is a parameter that designates whether the automatically address deciding unit 101 or the address designating unit 102 is used as the program loading system for the program module. And the program module is allocated on the main memory 104 by one of the loading systems of the automatically address deciding unit 101 and the address designating unit 102 under control of its operating system (OS).

FIG. 3 is a diagram showing the operation at the program loading system shown in FIG. 2 at the first conventional example. Referring to FIG. 3, the operation at the program loading system of the first conventional example is explained. FIG. 3(a) shows a state that an OS loads an application program. As shown in FIG. 3(a), an application program 113 is loaded into the lower address of the main memory 104 by the OS. After this, when the application program 113 storing in the main memory 104 loads a module of OS 112, since the program module to be loaded is a module related to the OS, as shown in FIG. 3(b), the module of OS 112 is loaded into the upper address by the program designating unit 102.

After this, when the application program 113 was executed and finished, as shown in FIG. 3(c), the memory area occupied by the application program 113 was made to be empty, and an empty area occurs in the main memory 104.

As mentioned above, the module of OS 112 was loaded soon after the application program 113 had been loaded, and the application program 113 was executed and finished and the area of the application program 113 was made to be empty. When these operation is continued and some application programs in all the application programs loaded into the main memory 104 are executed and areas of the executed application programs are made to be empty, discontinuing empty areas may occur in the main memory 104, and there is a problem that the main memory 104 cannot be utilized efficiently.

FIG. 4 is a block diagram showing a structure of the programmable controller at the Japanese Patent Application Laid-Open No. SHO 59-114602 as a second conventional example. The programmable controller controls program modules storing in a RAM by using a program loader.

As shown in FIG. 4, the programmable controller consists of a CPU 121, a ROM 122, a RAM 123, an I/O 124, an I/F 125, and a program loader 126.

The CPU 121 is a central processing unit and executes operation processes, and also executes sequence processes with the program loader 126. The ROM 122 stores programs that control and execute the operation processes, and also stores programs that control an interface with the program loader 126 and a mode control. The RAM 123 stores program modules and data required to execute programs in the ROM 122. The I/O 124 is an interface that outputs signals to external processes and inputs signals from the external processes. The I/F 125 is an interface that transfers data to and from the program loader 126 and generally uses a serial transfer. The program loader 126 calculates the empty area in the RAM 123 and makes the RAM 123 load the program modules from the ROM 122.

Next, at the second conventional example, the operation of loading processes of program modules at the programmable controller is explained. An OS storing in the ROM 122 transfers the start address and the size of each of the program modules storing in the RAM 123 to the program loader 126, by an interruption command from the program loader 126.

The program loader 126 confirms the size of a program module that is newly loaded and also confirms whether a program area, in which the new program module can be stored, exists in the RAM 123 or not. When it is possible that the new program module is stored, the program loader 126 calculates the start address of the new program module to be loaded and renews a management table in which the start address of each of the program modules storing in the RAM 123 is stored. When a request executing a program module is inputted from the I/O 124, the OS in the ROM 122 extracts the start address of the program module from the management table and makes the CPU 121 execute the program module.

However, there are several problems at the conventional program module management systems. First, at the first conventional example, it is necessary to keep the relative address between program modules. And when plural program modules are loaded, there is a problem that these plural program modules should be gathered together in a section.

Second, as mentioned above, at the case that a program module is set in plural different sections with other program modules as a loading unit, the same program module must be disposed in each of the plural different sections. Therefore, there is a problem that the capacity of the ROM is made to be large.

Furthermore, at the first and second conventional examples, there is a problem that a circuit, which manages and loads program modules in the RAM, is required. At the second conventional example, the program loader 126 is required.

Moreover, programs are executed on a RAM by a CPU, and when the capacity of the program modules is exceeded the capacity of the RAM, there is a problem that some program modules exceeded the capacity of the RAM cannot be executed by the CPU.

And at the first conventional example, it is necessary that the program modules in the memory are managed from the both directions of the upper address and the lower address. Therefore, there is a problem that the management of the program modules becomes complex.

SUMMARY OF THE INVENTION

It is therefore an object of the present invention to provide a program module management system and a method thereof, and a storing medium of management programs of the system, in which plural program modules are loaded into arbitrary addresses in a RAM efficiently without loading the same program module in the RAM and the plural program modules can be executed on the RAM by a CPU. And another object of the present invention is to provide a program module management system and a method thereof, and a storing medium of management programs of the system, in which program modules exceeded the capacity of the RAM can be executed on the ROM by the CPU.

According to a first aspect of the present invention for achieving the objects mentioned above, there is provided a program module management system. The program module management system provides a CPU for executing programs and operation processes, a ROM for storing program modules, a loading RAM which program modules are loaded into, and a RAM in which variables and stacks being necessary for executing the programs are stored. And the ROM provides a list table in which each start address of the program modules that are loaded into the loading RAM and each size of the program modules corresponding to the start address on the ROM are stored. And the loading RAM provides module management information in which each start address of the program modules storing in the loading RAM and each relative address of the program modules corresponding to the start address on the loading RAM are stored, in this, the relative address signifies the absolute value of the difference between each start address on the ROM and each start address on the loading RAM of each of the program modules=offset. And the program modules in the loading RAM are managed by management programs in the ROM.

According to a second aspect of the present invention in the first aspect, at the case that a program module group, which needs to be executed, already exists in the loading RAM, the program module group is not newly loaded from the ROM into the loading RAM, and the program module group is executed on the loading RAM by the CPU.

According to a third aspect of the present invention in the first aspect, at the case that a program module group is required to execute, the required program module group is compared with program modules existing in the loading RAM based on the list table, and only program modules not existing in the loading RAM are extracted from the ROM and are loaded into the loading RAM.

According to a fourth aspect of the present invention in the third aspect, at the case that the program modules are loaded into the loading RAM, the empty capacity of the loading RAM is compared with the capacity of the extracted program modules in the program module group, and when the empty capacity of the loading RAM is not sufficient for the total capacity of the extracted program modules judged to be loaded, unnecessary program modules are deleted from the loading RAM.

According to a fifth aspect of the present invention in the first aspect, at the case that a program module group is required to execute, the total capacity of the required program module group is compared with the total capacity of the loading RAM based on the list table, and when the total capacity of the loading RAM is large enough for the total capacity of the required program module group, all the module management information in the loading RAM is deleted, and the required program module group is loaded into the loading RAM.

According to a sixth aspect of the present invention in the fifth aspect, at the case that a program module group is required to execute, the total capacity of the required program module group is compared with the total capacity of the loading RAM based on the list table, and when the total capacity of the loading RAM is not sufficient for the total capacity of the required program module group, the program module group is executed on the ROM that stores the program module group.

According to a seventh aspect of the present invention in the first aspect, when the loading RAM is initialized, specified program modules are stationed permanently in the loading RAM, and the specified program modules are executed on the loading RAM without loading from the ROM.

According to an eighth aspect of the present invention in the seventh aspect, at the case that a program module group is required to execute, the total capacity of the required program module group is compared with the total capacity of the loading RAM except the capacity of the specified program modules based on the list table, and when the total capacity of the loading RAM except the capacity of the specified program modules is large enough for the total capacity of the required program module group, all the module management information in the loading RAM except that of the specified program modules is deleted, and the required program module group is loaded into the loading RAM.

According to a ninth aspect of the present invention in the seventh aspect, at the case that a program module group is required to execute, the total capacity of the required program module group is compared with the total capacity of the loading RAM except the capacity of the specified program modules based on the list table, and when the total capacity of the loading RAM except the capacity of the specified program modules is not sufficient for the total capacity of the required program module group, the program module group is executed on the ROM that stores the program module group.

According to a tenth aspect of the present invention, there is provided a program module management method at a program module management system. And the program module management system provides a CPU for executing programs and operation processes, a ROM for storing program modules, a loading RAM which program modules are loaded into, and a RAM in which variables and stacks being necessary for executing the programs are stored. And the ROM provides a list table in which each start address of the program modules that are loaded into the loading RAM and each size of the program modules corresponding to the start address on the ROM are stored. And the loading RAM provides module management information in which each start address of the program modules storing in the loading RAM and each relative address of the program modules corresponding to the start address on the loading RAM are stored, in this, the relative address signifies the absolute value of the difference between each start address on the ROM and each start address on the loading RAM of each of the program modules=offset. And the program module management method provides the steps of; judging whether a program module group loaded at the previous time and storing in the loading RAM is equal to a program module group in the list table that is requested to load into the loading RAM at this time or not, comparing program modules storing in the loading RAM with program modules in the program module group in the list table, when the judged result was not equal, extracting program modules that are required to newly load into the loading RAM based on the compared result, comparing the total capacity of the extracted program modules with the empty capacity of the loading RAM, loading the extracted program modules into the loading RAM when the empty capacity of the loading RAM is larger than the total capacity of the extracted program modules, and executing the program module group requested at this time on the loading RAM by the CPU.

According to an eleventh aspect of the present invention in the tenth aspect, the program module management method further provides the steps of; deleting unnecessary program modules in the loading RAM when the empty capacity of the loading RAM is smaller than the total capacity of the extracted program modules, comparing again the total capacity of the extracted program modules with the empty capacity of the loading RAM after the unnecessary program modules were deleted, loading the extracted program modules into the loading RAM when the empty capacity of the loading RAM is larger than the total capacity of the extracted program modules, and executing the program module group requested at this time on the loading RAM by the CPU.

According to a twelfth aspect of the present invention in the eleventh aspect, the program module management method further provides the steps of; comparing the total capacity of the program module group in the list table requested to be loaded with the total capacity of the loading RAM, when the empty capacity of the loading RAM after the unnecessary program modules were deleted is smaller than the total capacity of the extracted program modules, and executing the program module group requested at this time on the ROM by the CPU, when the total capacity of the program module group in the list table requested to be loaded is larger than the total capacity of the loading RAM.

According to a thirteenth aspect of the present invention in the twelfth aspect, the program module management method further provides the steps of; deleting all the module management information in the loading RAM, when the total capacity of the program module group in the list table requested to be loaded is smaller than the total capacity of the loading RAM, loading the program module group in the list table requested to be loaded into the loading RAM, and executing the program module group requested at this time on the loading RAM by the CPU.

According to a fourteenth aspect of the present invention in the tenth aspect, the program module management method further provides the steps of; stationing specified program modules permanently in the loading RAM when the loading RAM is initialized, and executing the specified program modules on the loading RAM without loading from the ROM by the CPU.

According to a fifteenth aspect of the present invention in the fourteenth aspect, the program module management method further provides the steps of; comparing the total capacity of the program module group in the list table requested to be loaded with the total capacity of the loading RAM except that for the program modules stationed permanently, when the empty capacity of the loading RAM after the unnecessary program modules were deleted is smaller than the total capacity of the extracted program modules, and executing the program module group requested at this time on the ROM by the CPU, when the total capacity of the program module group in the list table requested to be loaded is larger than the total capacity of the loading RAM except that for the program modules stationed permanently.

According to a sixteenth aspect of the present invention in the fourteenth aspect, the program module management method further provides the steps of; deleting all the module management information except that of the program modules stationed permanently in the loading RAM, when the total capacity of the program module group in the list table requested to be loaded is smaller than the total capacity of the loading RAM except that of the program modules stationed permanently, loading the program module group in the list table requested to be loaded into the loading RAM, and executing the program module group requested at this time on the loading RAM by the CPU.

According to a seventeenth aspect of the present invention, there is provided a storing medium of management programs at a program module management system. And the program module management system provides a CPU for executing programs and operation processes, a ROM for storing program modules, a loading RAM which program modules are loaded into, and a RAM in which variables and stacks being necessary for executing the programs are stored. And the ROM provides a list table in which each start address of the program modules that are loaded into the loading RAM and each size of the program modules corresponding to the start address on the ROM are stored. And the loading RAM provides module management information in which each start address of the program modules storing in the loading RAM and each relative address of the program modules corresponding to the start address on the loading RAM are stored, in this, the relative address signifies the absolute value of the difference between each start address on the ROM and each start address on the loading RAM of each of the program modules=offset. And the management programs provides the steps of; judging whether a program module group loaded at the previous time and storing in the loading RAM is equal to a program module group in the list table that is requested to load into the loading RAM at this time or not, comparing program modules storing in the loading RAM with program modules in the program module group in the list table, when the judged result was not equal, extracting program modules that are required to newly load into the loading RAM based on the compared result, comparing the total capacity of the extracted program modules with the empty capacity of the loading RAM, loading the extracted program modules into the loading RAM when the empty capacity of the loading RAM is larger than the total capacity of the extracted program modules, and executing the program module group requested at this time on the loading RAM by the CPU.

According to an eighteenth aspect of the present invention in the seventeenth aspect, the management programs further provides the steps of; deleting unnecessary program modules in the loading RAM when the empty capacity of the loading RAM is smaller than the total capacity of the extracted program modules, comparing again the total capacity of the extracted program modules with the empty capacity of the loading RAM after the unnecessary program modules were deleted, loading the extracted program modules into the loading RAM when the empty capacity of the loading RAM is larger than the total capacity of the extracted program modules, and executing the program module group requested at this time on the loading RAM by the CPU.

According to a nineteenth aspect of the present invention in the eighteenth aspect, the management programs further provides the steps of; comparing the total capacity of the program module group in the list table requested to be loaded with the total capacity of the loading RAM, when the empty capacity of the loading RAM after the unnecessary program modules were deleted is smaller than the total capacity of the extracted program modules, and executing the program module group requested at this time on the ROM by the CPU, when the total capacity of the program module group in the list table requested to be loaded is larger than the total capacity of the loading RAM.

According to a twentieth aspect of the present invention in the nineteenth aspect, the management programs further provides the steps of; deleting all the module management information in the loading RAM, when the total capacity of the program module group in the list table requested to be loaded is smaller than the total capacity of the loading RAM, loading the program module group in the list table requested to be loaded into the loading RAM, and executing the program module group requested at this time on the loading RAM by the CPU.

According to a twenty-first aspect of the present invention in the seventeenth aspect, the management programs further provides the steps of; stationing specified program modules permanently in the loading RAM when the loading RAM is initialized, and executing the specified program modules on the loading RAM without loading from the ROM by the CPU.

According to a twenty-second aspect of the present invention in the twenty-first aspect, the management programs further provides the steps of; comparing the total capacity of the program module group in the list table requested to be loaded with the total capacity of the loading RAM except that for the program modules stationed permanently, when the empty capacity of the loading RAM after the unnecessary program modules were deleted is smaller than the total capacity of the extracted program modules, and executing the program module group requested at this time on the ROM by the CPU, when the total capacity of the program module group in the list table requested to be loaded is larger than the total capacity of the loading RAM except that for the program modules stationed permanently.

According to a twenty-third aspect of the present invention in the twenty-first aspect, the management programs further provides the steps of; deleting all the module management information except that of the program modules stationed permanently in the loading RAM, when the total capacity of the program module group in the list table requested to be loaded is smaller than the total capacity of the loading RAM except that of the program modules stationed permanently, loading the program module group in the list table requested to be loaded into the loading RAM, and executing the program module group requested at this time on the loading RAM by the CPU.

BRIEF DESCRIPTION OF THE DRAWINGS

The objects and features of the present invention will become more apparent from the consideration of the following detailed description taken in conjunction with the accompanying drawings in which:

FIG. 6 is a diagram showing a list table composed of the start addresses and the sizes of program modules at the embodiment of the program module management system of the present invention;

FIG. 7 is a diagram showing a table of module management information at the embodiment of the program module management system of the present invention;

FIG. 8 is a flowchart showing the operation at a first embodiment of the program module management system of the present invention;

FIG. 9 is a diagram showing an example that extracts program modules at the first embodiment of the program module management system of the present invention;

FIG. 12 is a flowchart showing the operation at the second embodiment of the program module management system of the present invention.

DESCRIPTION OF THE PREFERRED EMBODIMENTS

Figure 1:
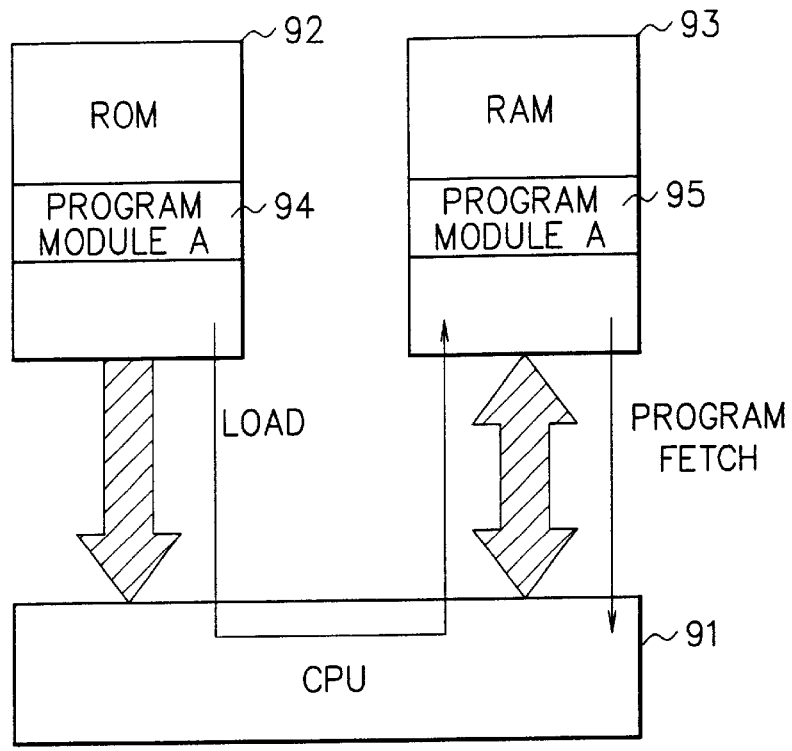
FIG. 1 is a block diagram showing a structure of a micro computer of a first conventional example.
Figure 2:
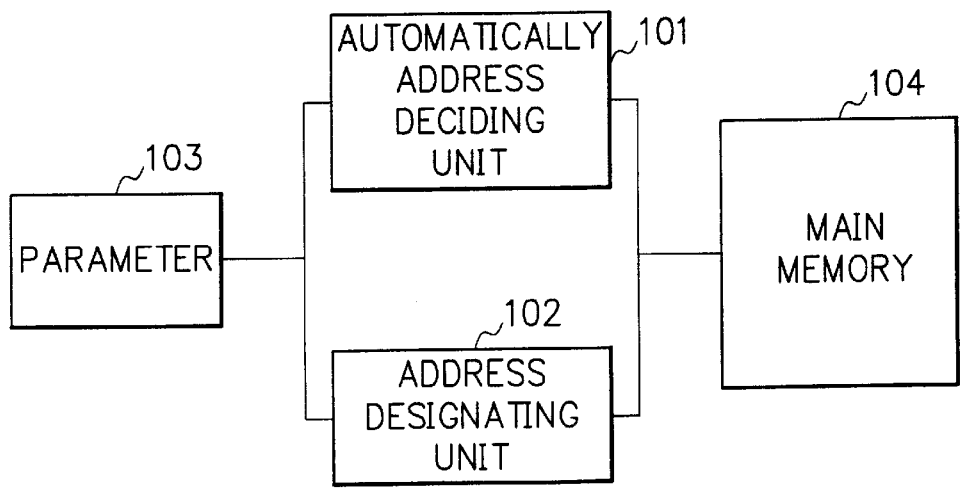
FIG. 2 is a block diagram showing a structure of a program loading system described in Japanese Patent Application Laid-Open No. SHO 63-228249 as the first conventional example.
Figure 3:
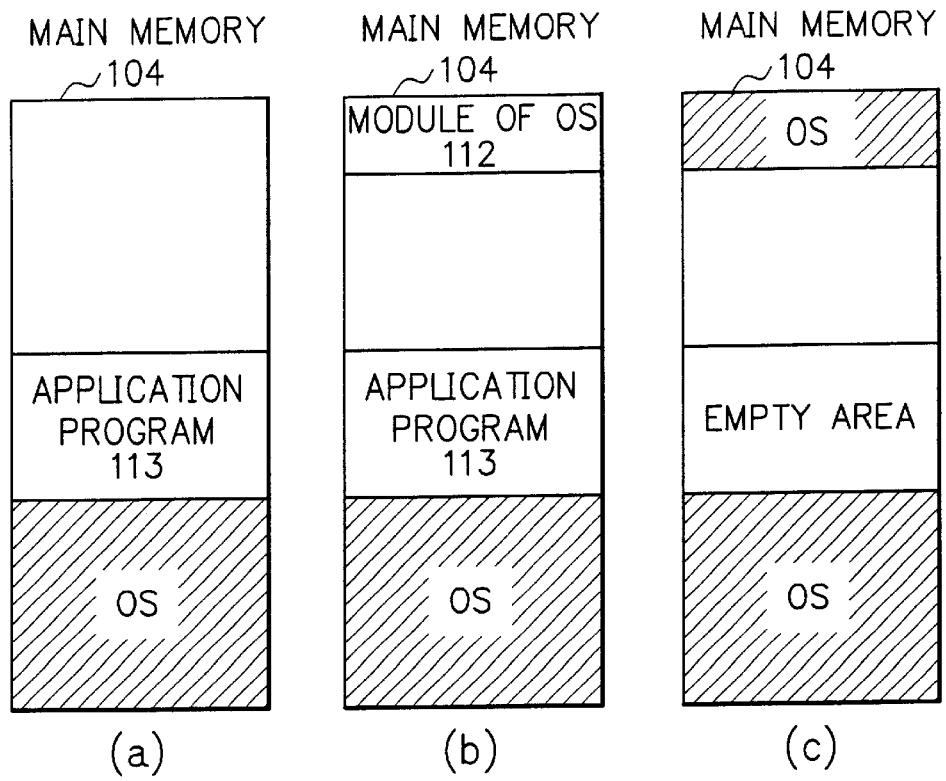
FIG. 3 is a diagram showing the operation at the program loading system shown in FIG. 2 at the first conventional example.
Figure 4:
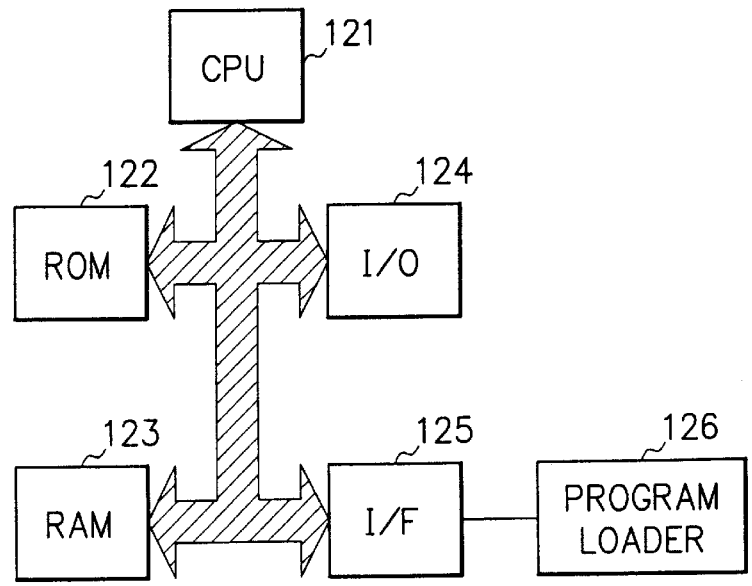
FIG. 4 is a block diagram showing a structure of a programmable controller at Japanese Patent Application Laid-Open No. SHO 59-114602 as a second conventional example.
Figure 5:
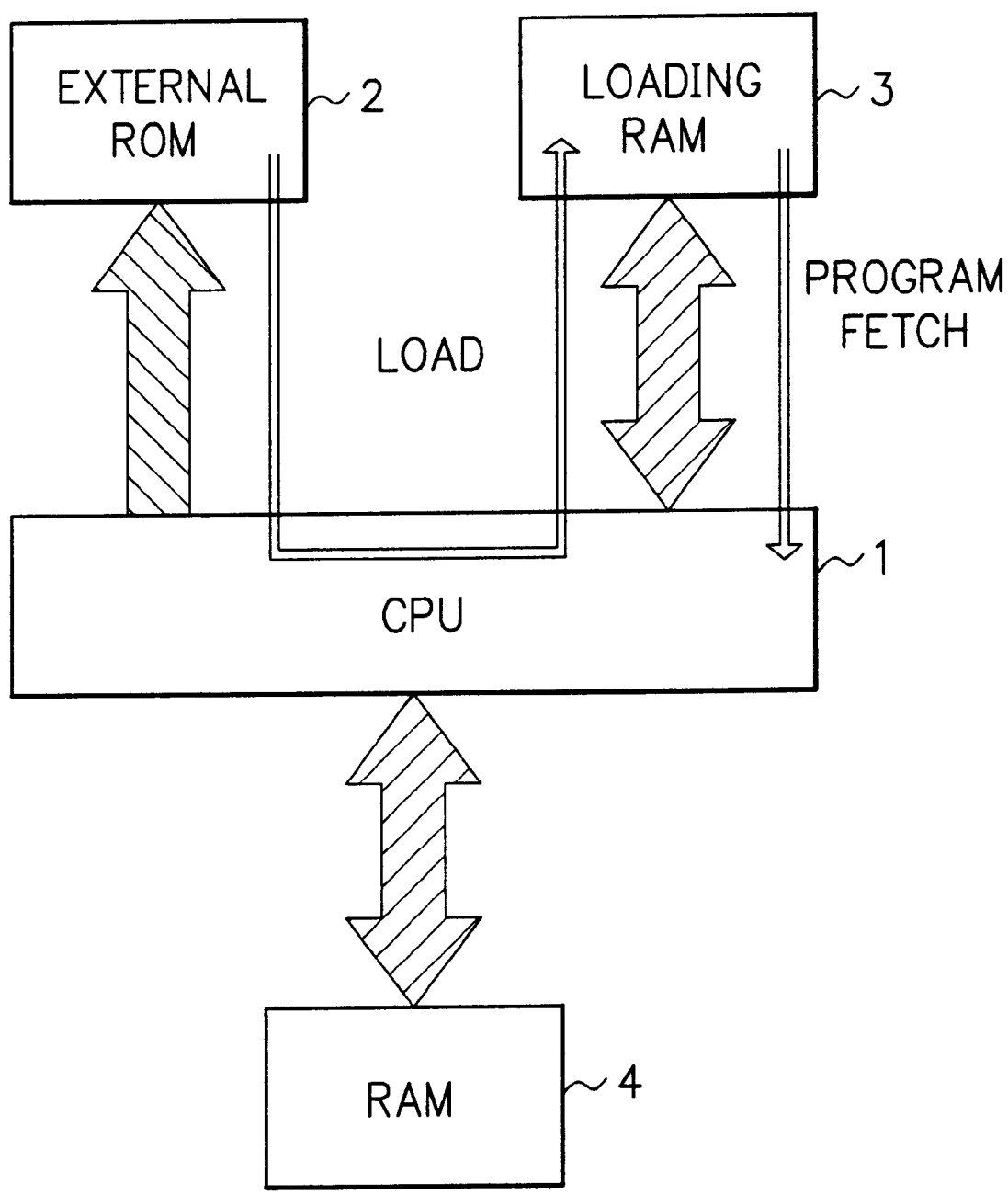
FIG. 5 is a block diagram showing a structure of an embodiment of a program module management system of the present invention.

Referring now to the drawings, embodiments of the present invention are explained in detail. FIG. 5 is a block diagram showing a structure of an embodiment of a program module management system of the present invention. As shown in FIG. 5, the embodiment of the program module management system of the present invention consists of a CPU 1, an external ROM 2, a loading RAM 3, and a RAM 4.

The CPU 1 executes programs and operation processes. The external ROM 2 stores program modules composed of program codes. Program modules are loaded into the loading RAM 3 from the external ROM 2 through the CPU 1. The RAM 4 stores stacks and variables using for executing programs.

In the external ROM 2, a list table, which is composed of the start address of each of the program modules on the external ROM 2 and the size of each of the program modules corresponding to the start address, is stored. And these program modules in the list table are requested program modules to be loaded into the loading RAM 3.

FIG. 6 is a diagram showing the list table composed of the start addresses and the sizes of the program modules at the embodiment of the program module management system of the present invention. As shown in FIG. 6, the list table storing in the external ROM 2 is composed of the start addresses (1) to (n) of the program modules on the external ROM 2 and the sizes of the program modules corresponding to each of the start addresses. That is, the start address and the size of each of the program modules requested to be loaded into the loading RAM 3 are stored in the list table corresponding to each other.

In the loading RAM 3, module management information, which is composed of the start addresses of the program modules loaded from the external ROM 2 and storing in the loading RAM 3, and the absolute value (offset) of the difference between the start address on the external ROM 2 and the start address on the loading RAM 3 of each of the program modules, is stored. And also a management program for the loading RAM is stored in the loading RAM 3.

FIG. 7 is a diagram showing a table of the module management information at the embodiment of the program module management system of the present invention. As shown in FIG. 7, the module management information is disposed in the loading RAM 3 and is composed of the start address of each of the program modules and the relative address. In this, the relative address is the offset, that is, the absolute value of the difference between the start address on the external ROM 2 and the start address on the loading RAM 3 of each of the program modules.

At the case that the CPU 1 fetches program modules composed of program codes from the loading RAM 3, that is, executes the program modules on the loading RAM 3, the CPU 1 gives the list table, in which a program module group that the CPU desires to fetch is listed, to management programs in the external ROM 2. The management program makes the loading RAM 3 load the program modules described in the list table from the external ROM 2, when the program modules can be loaded into the loading RAM 3. And the program modules storing in the loading RAM 3 are executed by the CPU 1. When the program modules cannot be loaded into the loading RAM 3, the CPU 1 executes the program modules on the external ROM 2.

FIG. 8 is a flowchart showing the operation at the first embodiment of the program module management system of the present invention. When a list table of program modules, which is requested to execute on the loading RAM 3, is given to the management program in the external ROM 2, it is judged whether the list table given to the management program at this time is equal to that at the previous time or not. That is, it is judged whether the loading process is the same for the same program modules processed at the previous time or not (step S1).

At the case that the list table at this time is equal to that at the previous time (YES at the step S1), it is judged that the requested program modules already exist in the loading RAM 3, and the requested program modules in the loading RAM 3 are executed (step S8).

At the case that the list table at this time is not equal to that at the previous time (NO at the step S1), the program modules requested for loading at this time in the list table are compared with the program modules currently existing in the loading RAM 3, and some program modules that do not exist in the loading RAM 3 and are to be loaded in the loading RAM 3 are extracted (step S2).

FIG. 9 is a diagram showing an example that extracts program modules at the first embodiment of the program module management system of the present invention. As shown in FIG. 9(*a*), program modules requested for loading by a list table are program modules 52 composed of program modules A, B, C, D, and E. And as shown in FIG. 9(*b*), the program modules A, B, and D have been already stored in a loading RAM 53. With the result of the comparison, it is judged that necessary program modules to be loaded additionally are the program modules C and E.

At the steps S1 and S2, it was judged whether the program modules to be loaded into the loading RAM 53 (3) already existed in the loading RAM 53 (3) or not, and the necessary program modules to be loaded additionally were extracted. After this, the total capacity of the necessary program modules to be loaded additionally is compared with the empty capacity of the loading RAM 53 (3) at the present time (step S3).

At the case that all the necessary program modules judged to be loaded additionally can be loaded into the empty capacity of the loading RAM 53 (3) (YES at the step S3), all the extracted necessary program modules to be loaded additionally are loaded into the empty capacity of the loading RAM 53 (3) (step S10). And the requested program modules in the loading RAM 3 are executed (the step S8).

At the case that all the necessary program modules judged to be loaded additionally cannot be loaded into the empty capacity of the loading RAM 53 (3) (NO at the step S3), some unnecessary program modules in the loading RAM 53 (3) are deleted (step S4). First, a program module, which is one of the program modules to be executed at this time and already exists at the uppermost address in the loading RAM 53 (3), is searched. And program modules storing in the loading RAM 53 (3) at the addresses under the searched program module are the unnecessary program modules. That is, the unnecessary program modules are program modules that were loaded after the searched program module had been loaded.

Referring to FIG. 9, the deletion of the unnecessary program modules is explained. As shown in FIG. 9(*a*), the program modules requested to be loaded are program modules 52 composed of the program modules A, B, C, D, and E. And in FIG. 9(b), the program modules already existing in the loading RAM 53 are program modules A, B, and D, and the program module existing in the uppermost address is the program module D. Therefore, as shown in FIG. 9(c), the program modules EE and FF, which were loaded after the program module D had been loaded and also are not requested to be loaded at this time, are deleted.

Next, after deleting the unnecessary program modules in the loading RAM 53 (3), it is judged again whether all the program modules requested to be loaded and not existing in the loading RAM 53 (3) can be loaded into the empty capacity of the loading RAM 53 (3) or not (step S5). At the case that the extracted necessary program modules can be loaded (YES at the step S5), the necessary program modules are loaded in the empty capacity of the loading RAM 53 (3) (step the S10).

At the case that the extracted necessary program modules cannot be loaded in the empty capacity of the loading RAM 53 (3) (NO at the step S5), the total capacity of all the program modules requested by the list table is compared with the total capacity of the loading RAM 53 (3) (step S6).

At the case that the total capacity of all the program modules requested by the list table is larger than the total capacity of the loading RAM 53 (3) (YES at the step S6), it is judged that the program modules cannot be loaded in the loading RAM 53 (3), and the program modules are executed on the external ROM 2 without loading the program modules into the loading RAM 3 (step S9).

At the case that the total capacity of all the program modules requested by the list table is smaller than the total capacity of the loading RAM 53 (3) (NO at the step S6), the module management information of the program modules storing in the loading RAM 53 (3) is initialized (deleted). And all the program modules requested to be loaded by the list table are loaded into the loading RAM 53 (3) (step S7). In this, when the module management information is initialized, new program modules can be overwritten on the program modules existing in the loading RAM 53 (3). Therefore, time deleting the existing program modules in the loading RAM 53 (3) can be saved.

As mentioned above, all the program modules requested by the list table were loaded in the loading RAM 53 (3), and after this, the program modules loaded into the loading RAM 53 (3) are executed (step S8).

When the program modules in the loading RAM 53 (3) are executed at the step S8, the start addresses of the program modules to be executed are designated as a program executing function. With this, the program modules whose start addresses were designated are executed on the loading RAM 53 (3). The program executing function is a function to distinguish whether the program module is executed or not.

Figure 10:
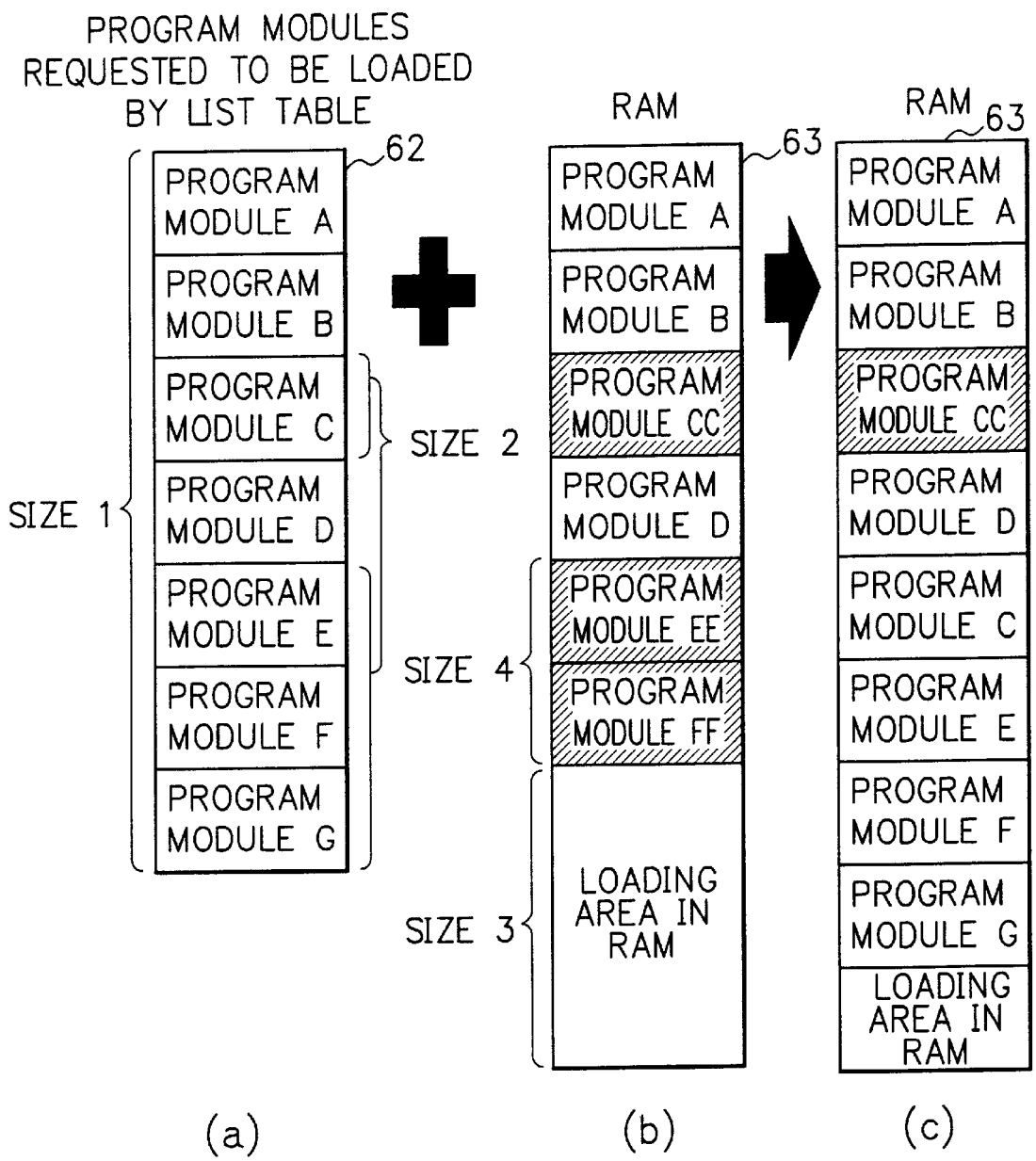
FIG. 10 is a diagram showing an example that expresses program module management at the first embodiment of the program module management system of the present invention.

FIG. 10 is a diagram showing an example that expresses program module management at the first embodiment of the program module management system of the present invention. As shown in FIG. 10(a), program modules requested for loading by a list table are program modules 62 composed of program modules A, B, C, D, E, F, and G. And as shown in FIG. 10(b), the program modules A, B, CC, D, EE, and FF have been already stored in a loading RAM 63.

Referring to FIGS. 8 and 10, the program module management is explained. At the step S1, when it is judged that the list table at this time is different from that at the previous time, at the step S2, the program modules 62 (A, B, C, D, E, F and G) requested for loading by the list table are compared with the program modules (A, B, CC, D, EE, and FF) existing in the loading RAM 63. From the result of the comparison, it is recognized that the program modules A, B, and D exist in the loading RAM 63, and it is judged that the program modules C, E, F, and G must be loaded into the loading RAM 63.

At the step S3, the capacity (Size 2) of all the program modules judged to be loaded is compared with the empty capacity (Size 3) of the loading RAM 63. When the empty capacity (Size 3) of the loading RAM 63 is judged to be not enough to load all the program modules judged to be loaded, at the step S4, it is judged that the unnecessary program modules are EE and FF, and the program modules EE and FF are deleted from the loading RAM 63.

At the step S5, the capacity (Size 2) of all the program modules judged at the step 2 to be loaded is again compared with the empty capacity (Size 3+Size 4) of the loading RAM 63. At this case, since the empty capacity (Size 3+Size 4) of the loading RAM 63 is larger than the capacity (Size 2) of all the program modules judged to be loaded, it is judged that all the program modules judged to be loaded can be loaded.

At the step S10, the program modules C, E, F, and G are loaded into the loading RAM 63 as shown in FIG. 10(c). And at the step S8, the program modules A, B, C, D, E, F, and G in the loading RAM 63 are executed.

Figure 11:
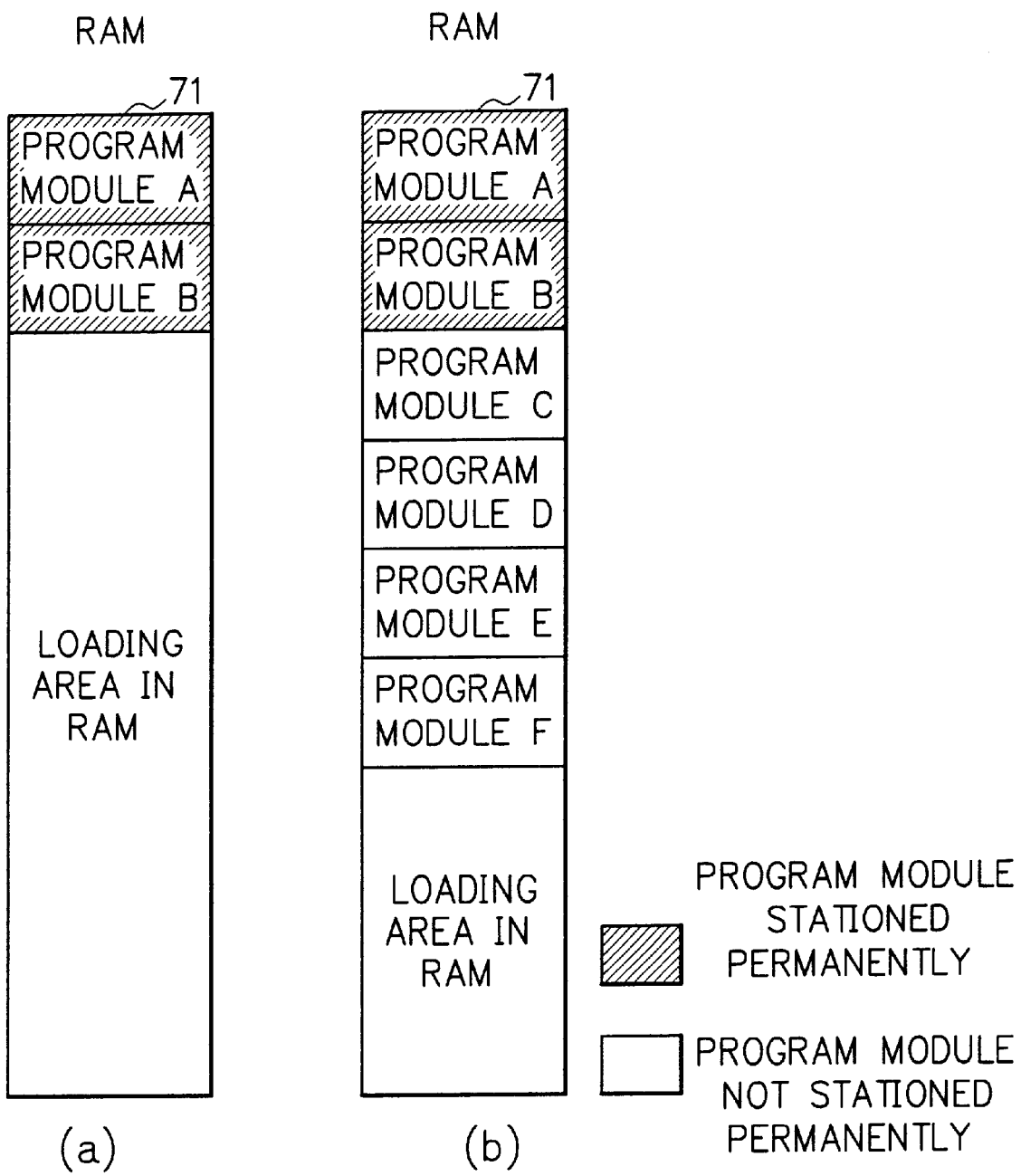
FIG. 11 is a diagram showing an example that expresses program module management at a second embodiment of the program module management system of the present invention.

Next, a second embodiment of the program module management system of the present invention is explained. FIG. 11 is a diagram showing an example that expresses program module management at the second embodiment of the program module management system of the present invention. At the second embodiment of the program module management system of the present invention, some specified program modules are stationed permanently in a RAM and the process time until the specified program modules are loaded and executed is reduced without operating the program module management process.

First, the difference points between the first embodiment and the second embodiment are explained. As shown in FIG. 11(a), as a first difference point, at the second embodiment, when variables using for the management programs are initialized, program modules, which are to be stationed permanently, are loaded into a loading RAM 71 beforehand.

And as a second difference point, at the step S7 shown in FIG. 8, all the module management information was deleted at the first embodiment, however, at the second embodiment, all the module management information except that of the program modules stationed permanently is deleted.

Actually, as shown in FIG. 11(a), the program modules to be stationed permanently A and B are loaded in the loading RAM 71 beforehand. And next, as shown in FIG. 11(b), program modules not stationed permanently C, D, E, and F are loaded in the loading RAM 71. And when the process at the step S7 shown in FIG. 8 was executed, the module management information of the program modules C, D, E, and F is initialized, that is, all the module management information except that of the program modules A and B is deleted.

FIG. 12 is a flowchart showing the operation at the second embodiment of the program module management system of the present invention. When a list table of program modules, which are requested to load into the loading RAM 3, is given to the management program in the external ROM 2, it is judged whether the list table given to the management program at this time is equal to that at the previous time or not. That is, it is judged whether the loading process is the same for the same program modules processed at the previous time or not (step S11).

At the case that the list table at this time is equal to that at the previous time (YES at the step S11), it is judged that requested program modules already exist in the loading RAM 3, and the requested program modules in the loading RAM 3 are executed (step S18).

At the case that the list table at this time is not equal to that at the previous time (NO at the step S11), the program modules requested for loading at this time in the list table are compared with the program modules currently existing in the loading RAM 3, and program modules that do not exist in the loading RAM 3 and are to be loaded in the loading RAM 3 are extracted (step S12).

At the steps S11 and S12, it was judged whether the program modules to be loaded into the loading RAM 3 existed or not in the loading RAM 3, and the necessary program modules to be loaded additionally were extracted. After this, the total capacity of the necessary program modules to be loaded additionally is compared with the empty capacity of the loading RAM 3 at the present time (step S13).

At the case that all the necessary program modules judged to be loaded additionally can be loaded into the empty capacity of the loading RAM 3 (YES at the step S13), all the extracted necessary program modules to be loaded additionally are loaded into the empty capacity of the loading RAM 3 (step S20). And at the step S18, the program modules in the loading RAM 3 are executed.

At the case that all the necessary program modules judged to be loaded additionally cannot be loaded into the empty capacity of the loading RAM 3 (NO at the step S13), some unnecessary program modules existing in the loading RAM 3 are deleted (step S14). First, a program module, which is one of the program modules to be loaded at this time and already exists at the uppermost address in the loading RAM 3, is searched. And program modules storing in the loading RAM 3 at the addresses under the searched program module are the unnecessary program modules. That is, the unnecessary program modules were loaded after the searched program module had been loaded.

Next, after deleting the unnecessary program modules in the loading RAM 3, it is judged again whether all the program modules requested to be loaded and not existing in the loading RAM 3 can be loaded in the empty capacity of the loading RAM 3 or not (step S15). At the case that the extracted necessary program modules can be loaded (YES at the step S15), the necessary program modules are loaded in the empty capacity of the loading RAM 3 (step the S20).

At the case that the extracted necessary program modules cannot be loaded in the empty capacity of the loading RAM 3 (NO at the step S15), the total capacity of all the program modules requested by the list table is compared with the total capacity of the loading RAM 3 except that of the program modules stationed permanently (step S16).

At the case that the total capacity of all the program modules requested by the list table is larger than the total capacity of the loading RAM 3 except that of the program modules stationed permanently (YES at the step S16), it is judged that the program modules requested by the list table cannot be loaded into the loading RAM 3, and the program modules are executed on the external ROM 2 without loading into the loading RAM 3 (step S19).

At the case that the total capacity of all the program modules requested by the list table is smaller than the total capacity of the loading RAM 3 except that of the program modules stationed permanently (NO at the step S16), all the module management information except that of the program modules stationed permanently is initialized (deleted), and all the program modules requested to be loaded by the list table are loaded into the loading RAM 3 (step S17).

As mentioned above, all the program modules requested by the list table were loaded in the loading RAM 3, and after this, the program modules loaded into the loading RAM 3 are executed (step S18).

When the program modules in the loading RAM 3 are executed at the step S18, the start address of a program module to be executed is designated as a program executing function. With this, the program module whose start address was designated is executed on the loading RAM 3. The program executing function is a function to distinguish whether the program module is executed or not.

As mentioned above, at the second embodiment of the present invention, without executing the management program, the start address of each of the program modules stationed permanently is directly given to the program executing function at the step S18, and the program modules can be executed on the loading RAM 3.

As clearly mentioned above, according to the present invention, when plural program modules are loaded into a RAM, it is not necessary that the plural program modules are gathered in a section unit. And each of the plural program modules storing in an arbitrary address on a ROM is stored in an arbitrary address on the RAM, and each of the plural program modules can be executed on the RAM.

And according to the present invention, as mentioned above, the plural program modules are not necessary to be loaded and executed in the section unit. That is, each of the plural program modules can be loaded into the RAM and executed on the RAM in the module unit, without caring about the address of the program module in the ROM. Consequently, it is not necessary that the same program modules are stored in the ROM plurally, and also it is not necessary that the same program modules are stored in the RAM plurally. Therefore, the number of the ROMs can be reduced and the RAM can be used efficiently, further the loading time can be reduced.

According to the present invention, a program loader was required at the conventional example, however, a circuit and a system structure for managing the program modules in the RAM are not needed. That is, when the RAM can read and write data, the RAM does not need any specified function at the present invention. Therefore, the size of the circuit can be reduced and its designing can be simplified.

And according to the present invention, at the case that the program modules cannot be loaded into the RAM by the management program because of the limitation of the capacity, the program modules can be executed on the ROM. Therefore, the program modules can be made and be disposed without considering their sizes.

And according to the present invention, only the management program manages the program modules in the RAM. Therefore, the program module management in the RAM is not made to be complex, and the program modules loaded into the RAM are not damaged.

Furthermore, specified program modules can be stationed permanently in the RAM. Therefore, the specified program modules in the RAM can be executed without loading them, and the process time needed for loading can be reduced.

While the present invention has been described with reference to the particular illustrative embodiments, it is not to be restricted by those embodiments but only by the appended claims. It is to be appreciated that those skilled in the art can change or modify the embodiments without departing from the scope and spirit of the present invention.

What is claimed is:

1. A program module management system, comprising:
a CPU for executing programs and operation processes;
a ROM for storing program modules;
a loading RAM which program modules are loaded into; and
a RAM in which variables and stacks being necessary for executing said programs are stored, wherein:
said ROM provides a list table in which each start address of said program modules that are loaded into said loading RAM and each size of said program modules corresponding to said start address on said ROM are stored, and
said loading RAM provides module management information in which each start address of said program modules storing in said loading RAM and each relative address of said program modules corresponding to said start address on said loading RAM are stored, in this, said relative address signifies the absolute value of the difference between each start address on said ROM and each start address on said loading RAM of each of said program modules= offset, and
said program modules in said loading RAM are managed by management programs in said ROM.

2. A program module management system in accordance with claim 1, wherein:
at the case that a program module group, which needs to be executed, already exists in said loading RAM, said program module group is not newly loaded from said ROM into said loading RAM, and said program module group is executed on said loading RAM by said CPU.

3. A program module management system in accordance with claim 1, wherein:
at the case that a program module group is required to execute, said required program module group is compared with program modules existing in said loading RAM based on said list table, and only program modules not existing in said loading RAM are extracted from said ROM and are loaded into said loading RAM.

4. A program module management system in accordance with claim 3, wherein:
at the case that said program modules are loaded into said loading RAM, the empty capacity of said loading RAM is compared with the capacity of said extracted program modules in said program module group, and
when said empty capacity of said loading RAM is not sufficient for the total capacity of said extracted program modules judged to be loaded,
unnecessary program modules are deleted from said loading RAM.

5. A program module management system in accordance with claim 1, wherein:
at the case that a program module group is required to execute, the total capacity of said required program module group is compared with the total capacity of said loading RAM based on said list table, and
when said total capacity of said loading RAM is large enough for the total capacity of said required program module group,
all said module management information in said loading RAM is deleted, and said required program module group is loaded into said loading RAM.

6. A program module management system in accordance with claim 5, wherein:
at the case that a program module group is required to execute, the total capacity of said required program module group is compared with the total capacity of said loading RAM based on said list table, and
when said total capacity of said loading RAM is not sufficient for the total capacity of said required program module group,
said program module group is executed on said ROM that stores said program module group.

7. A program module management system in accordance with claim 1, wherein:
when said loading RAM is initialized, specified program modules are stationed permanently in said loading RAM, and said specified program modules are executed on said loading RAM without loading from said ROM.

8. A program module management system in accordance with claim 7, wherein:
at the case that a program module group is required to execute, the total capacity of said required program module group is compared with the total capacity of said loading RAM except the capacity of said specified program modules based on said list table, and
when said total capacity of said loading RAM except said capacity of said specified program modules is large enough for the total capacity of said required program module group,
all said module management information in said loading RAM except that of said specified program modules is deleted, and said required program module group is loaded into said loading RAM.

9. A program module management system in accordance with claim 7, wherein:
at the case that a program module group is required to execute, the total capacity of said required program module group is compared with the total capacity of said loading RAM except the capacity of said specified program modules based on said list table, and
when said total capacity of said loading RAM except said capacity of said specified program modules is not sufficient for the total capacity of said required program module group,
said program module group is executed on said ROM that stores said program module group.

10. A program module management method at a program module management system, wherein:
said program module management system, comprising:
a CPU for executing programs and operation processes;
a ROM for storing program modules;
a loading RAM which program modules are loaded into; and
a RAM in which variables and stacks being necessary for executing said programs are stored, wherein:
said ROM provides a list table in which each start address of said program modules that are loaded into said loading RAM and each size of said program modules corresponding to said start address on said ROM are stored, and
said loading RAM provides module management information in which each start address of said program modules storing in said loading RAM and each relative address of said program modules corresponding to said start address on said loading RAM are stored, in this, said relative address signifies the absolute value of the difference between each start address on said ROM and each start address on said loading RAM of each of said program modules=offset, and said program module management method, comprising the steps of:

judging whether a program module group loaded at the previous time and storing in said loading RAM is equal to a program module group in said list table that is requested to load into said loading RAM at this time or not;

comparing program modules storing in said loading RAM with program modules in said program module group in said list table, when the judged result was not equal;

extracting program modules that are required to newly load into said loading RAM based on the compared result;

comparing the total capacity of said extracted program modules with the empty capacity of said loading RAM;

loading said extracted program modules into said loading RAM when said empty capacity of said loading RAM is larger than said total capacity of said extracted program modules; and executing said program module group requested at this time on said loading RAM by said CPU.

11. A program module management method at a program module management system in accordance with claim 10, further comprising the steps of:

deleting unnecessary program modules in said loading RAM when said empty capacity of said loading RAM is smaller than said total capacity of said extracted program modules;

comparing again the total capacity of said extracted program modules with the empty capacity of said loading RAM after said unnecessary program modules were deleted;

loading said extracted program modules into said loading RAM when said empty capacity of said loading RAM is larger than said total capacity of said extracted program modules; and executing said program module group requested at this time on said loading RAM by said CPU.

12. A program module management method at a program module management system in accordance with claim 11, further comprising the steps of:

comparing the total capacity of said program module group in said list table requested to be loaded with the total capacity of said loading RAM, when said empty capacity of said loading RAM after said unnecessary program modules were deleted is smaller than said total capacity of said extracted program modules; and executing said program module group requested at this time on said ROM by said CPU, when said total capacity of said program module group in said list table requested to be loaded is larger than the total capacity of said loading RAM.

13. A program module management method at a program module management system in accordance with claim 12, further comprising the steps of:

deleting all said module management information in said loading RAM, when said total capacity of said program module group in said list table requested to be loaded is smaller than the total capacity of said loading RAM;

loading said program module group in said list table requested to be loaded into said loading RAM; and executing said program module group requested at this time on said loading RAM by said CPU.

14. A program module management method at a program module management system in accordance with claim 10, further comprising the steps of:

stationing specified program modules permanently in said loading RAM when said loading RAM is initialized; and executing said specified program modules on said loading RAM without loading from said ROM by said CPU.

15. A program module management method at a program module management system in accordance with claim 14, further comprising the steps of:

comparing the total capacity of said program module group in said list table requested to be loaded with the total capacity of said loading RAM except that for said program modules stationed permanently, when said empty capacity of said loading RAM after said unnecessary program modules were deleted is smaller than said total capacity of said extracted program modules; and executing said program module group requested at this time on said ROM by said CPU, when said total capacity of said program module group in said list table requested to be loaded is larger than the total capacity of said loading RAM except that for said program modules stationed permanently.

16. A program module management method at a program module management system in accordance with claim 14, further comprising the steps of:

deleting all said module management information except that of said program modules stationed permanently in said loading RAM, when said total capacity of said program module group in said list table requested to be loaded is smaller than the total capacity of said loading RAM except that of said program modules stationed permanently;

loading said program module group in said list table requested to be loaded into said loading RAM; and executing said program module group requested at this time on said loading RAM by said CPU.

17. A storing medium of management programs at a program module management system, wherein:

said program module management system, comprising:
a CPU for executing programs and operation processes;
a ROM for storing program modules;
a loading RAM which program modules are loaded into; and
a RAM in which variables and stacks being necessary for executing said programs are stored, wherein:

said ROM provides a list table in which each start address of said program modules that are loaded into said loading RAM and each size of said program modules corresponding to said start address on said ROM are stored, and said loading RAM provides module management information in which each start address of said program modules storing in said loading RAM and each relative address of said program modules corresponding to said start address on said loading RAM are stored, in this, said relative address signifies the absolute value of the difference between each start address on said ROM and each start address on said loading RAM of each of said program modules=offset, and said management programs, comprising the steps of:

judging whether a program module group loaded at the previous time and storing in said loading RAM is equal to a program module group in said list table that is requested to load into said loading RAM at this time or not;

comparing program modules storing in said loading RAM with program modules in said program module group in said list table, when the judged result was not equal;

extracting program modules that are required to newly load into said loading RAM based on the compared result;

comparing the total capacity of said extracted program modules with the empty capacity of said loading RAM;

loading said extracted program modules into said loading RAM when said empty capacity of said loading RAM is larger than said total capacity of said extracted program modules; and executing said program module group requested at this time on said loading RAM by said CPU.

18. A storing medium of management programs at a program module management system in accordance with claim 17, wherein:

said management programs, further comprising the steps of:

deleting unnecessary program modules in said loading RAM when said empty capacity of said loading RAM is smaller than said total capacity of said extracted program modules;

comparing again the total capacity of said extracted program modules with the empty capacity of said loading RAM after said unnecessary program modules were deleted;

loading said extracted program modules into said loading RAM when said empty capacity of said loading RAM is larger than said total capacity of said extracted program modules; and executing said program module group requested at this time on said loading RAM by said CPU.

19. A storing medium of management programs at a program module management system in accordance with claim 18, wherein:

said management programs, further comprising the steps of:

comparing the total capacity of said program module group in said list table requested to be loaded with the total capacity of said loading RAM, when said empty capacity of said loading RAM after said unnecessary program modules were deleted is smaller than said total capacity of said extracted program modules; and executing said program module group requested at this time on said ROM by said CPU, when said total capacity of said program module group in said list table requested to be loaded is larger than the total capacity of said loading RAM.

20. A storing medium of management programs at a program module management system in accordance with claim 19, wherein:

said management programs, further comprising the steps of:

deleting all said module management information in said loading RAM, when said total capacity of said program module group in said list table requested to be loaded is smaller than the total capacity of said loading RAM;

loading said program module group in said list table requested to be loaded into said loading RAM; and executing said program module group requested at this time on said loading RAM by said CPU.

21. A storing medium of management programs at a program module management system in accordance with claim 17, wherein:

said management programs, further comprising the steps of:

stationing specified program modules permanently in said loading RAM when said loading RAM is initialized; and executing said specified program modules on said loading RAM without loading from said ROM by said CPU.

22. A storing medium of management programs at a program module management system in accordance with claim 21, wherein:

said management programs further comprising the steps of:

comparing the total capacity of said program module group in said list table requested to be loaded with the total capacity of said loading RAM except that for said program modules stationed permanently, when said empty capacity of said loading RAM after said unnecessary program modules were deleted is smaller than said total capacity of said extracted program modules; and executing said program module group requested at this time on said ROM by said CPU, when said total capacity of said program module group in said list table requested to be loaded is larger than the total capacity of said loading RAM except that for said program modules stationed permanently.

23. A storing medium of management programs at a program module management system in accordance with claim 21, wherein:

said management programs further comprising the steps of:

deleting all said module management information except that of said program modules stationed permanently in said loading RAM, when said total capacity of said program module group in said list table requested to be loaded is smaller than the total capacity of said loading RAM except that of said program modules stationed permanently;

loading said program module group in said list table requested to be loaded into said loading RAM; and executing said program module group requested at this time on said loading RAM by said CPU.

* * * * *